United States Patent [19]
Price

[11] Patent Number: 5,346,269
[45] Date of Patent: Sep. 13, 1994

[54] PLATFORM TOOL FOR MOVING MATERIAL

[76] Inventor: Owen D. Price, P.O. Box 6, Orangeville, Utah 84537

[21] Appl. No.: 4,454

[22] Filed: Jan. 14, 1993

Related U.S. Application Data

[63] Continuation of Ser. No. 748,442, Aug. 22, 1991, abandoned.

[51] Int. Cl.$^5$ ............................ A01B 1/02; E01H 5/02
[52] U.S. Cl. ........................................ 294/49; 294/54.5
[58] Field of Search ...................... 294/7, 49, 51, 54.5, 294/55, 59; 15/236.01, 257.1; 37/130, 196, 264–266, 285; 254/131.5; 280/18, 19

[56] References Cited

U.S. PATENT DOCUMENTS

| | | | |
|---|---|---|---|
| 84,797 | 12/1868 | Connolly | 294/49 |
| 760,639 | 5/1904 | Menzies | 294/54.5 |
| 1,367,032 | 2/1921 | Ferdon | 294/49 X |
| 1,634,204 | 6/1927 | Nims | 294/54.5 |
| 2,977,130 | 3/1961 | Jordan | 294/54.5 X |
| 3,024,547 | 3/1962 | Harrison | 294/54.5 X |
| 3,223,383 | 12/1965 | Hrabal | 294/54.5 X |
| 3,328,067 | 6/1967 | Winkler | 294/54.5 |
| 3,343,807 | 9/1967 | Moraski | 294/54.5 X |
| 3,369,835 | 2/1968 | Marino | 294/54.5 |
| 3,380,772 | 4/1968 | Lissakers | 294/54.5 X |
| 3,484,801 | 12/1969 | Carlin | 280/18 |
| 3,583,746 | 6/1971 | Lissakers | 294/54.5 X |
| 3,727,964 | 4/1973 | Nordvik | 294/51 X |
| 4,149,744 | 4/1979 | Bonnes | 294/54.5 |
| 4,214,385 | 7/1980 | Baranowski et al. | 294/55 X |
| 4,245,411 | 1/1981 | McMath | 294/55 X |
| 4,559,726 | 12/1985 | Moisan | 294/54.5 X |
| 4,607,872 | 8/1986 | Herner | 294/54.5 |
| 4,686,734 | 8/1987 | Kahan | 294/55 X |

FOREIGN PATENT DOCUMENTS 221865 9/1942 Switzerland ........................ 294/49

*Primary Examiner*—Johnny D. Cherry
*Attorney, Agent, or Firm*—Mallinckrodt & Mallinckrodt

[57] ABSTRACT

A tool for moving material includes a relatively large rectangular platform for receiving material to be moved. A handle extends from the rearward edge of the platform and is secured to the platform by a handle receiving shank secured to the platform over a portion of its length from the rearward edge of the platform. The platform is preferably a flat sheet of semi-rigid or slightly flexible material such as an aluminum-spring steel alloy and the handle receiving shank causes a slight curve in the material over the length of attachment. The platform is such that as it is pushed under material to be moved, and such material is loaded onto the platform, the platform curves or sags to receive and hold such material so that the loaded platform may be dragged and the loaded material will substantially remain on the platform during such dragging.

10 Claims, 3 Drawing Sheets

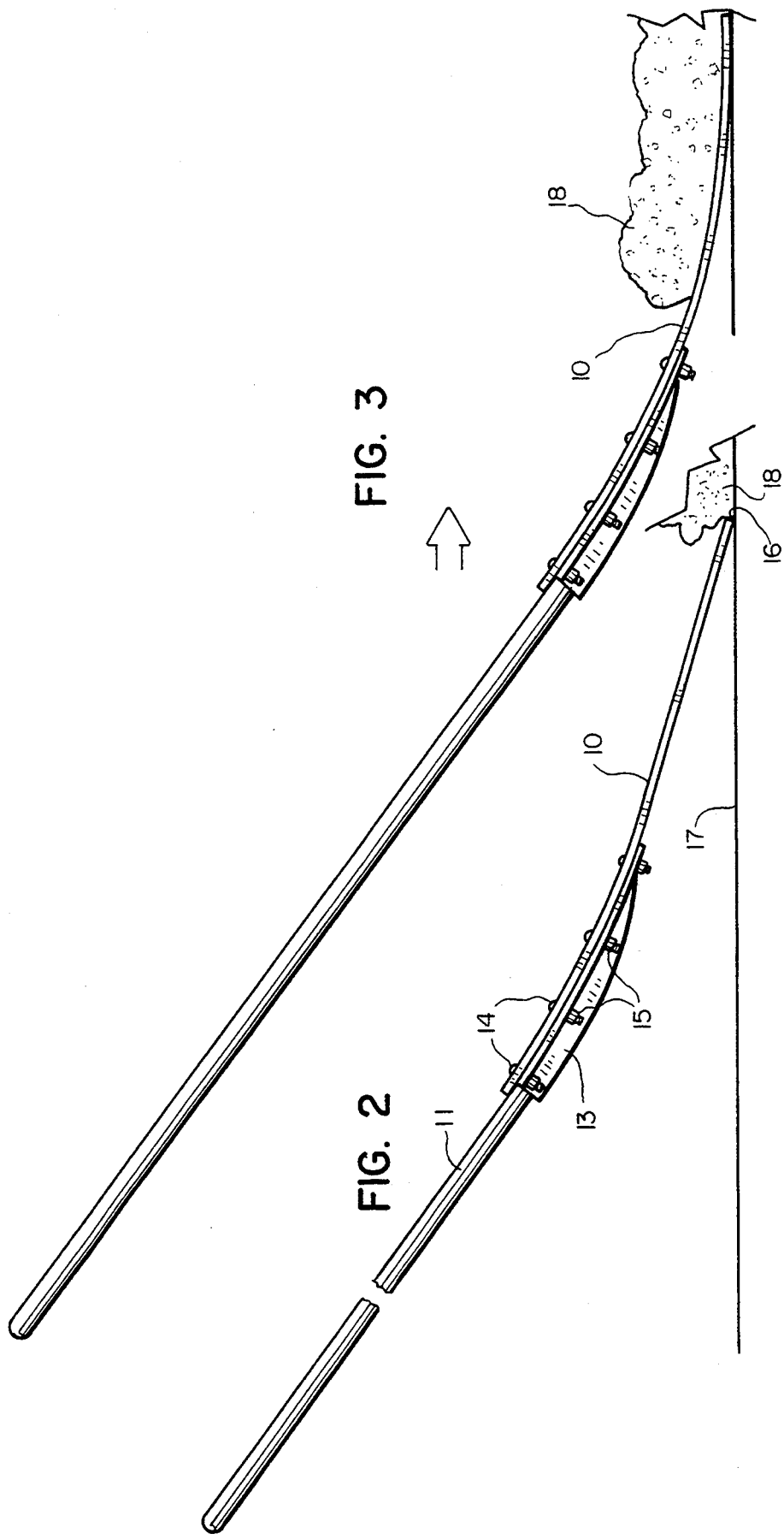

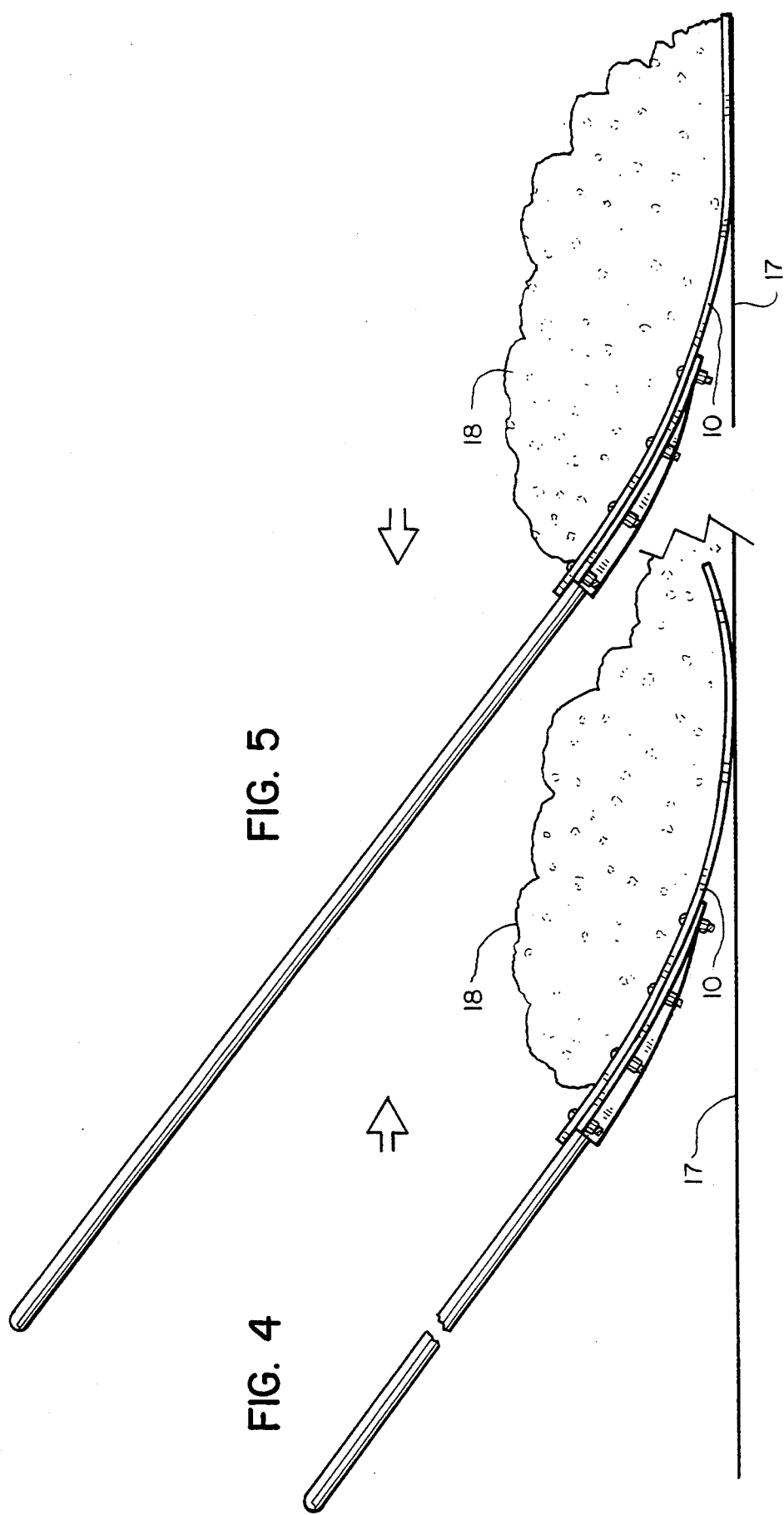

PLATFORM TOOL FOR MOVING MATERIAL

This is a continuation of application Ser. No. 748,442, filed Aug. 22, 1991, now abandoned.

BACKGROUND OF THE INVENTION

1 Field

The invention is in the field of tools for cleaning areas of debris or snow and transporting such debris or snow to other areas, or for moving material from one area to another.

2. State of the Art

Shovels are the most common tool used for removing snow, dirt, gravel, or other materials from a surface and moving such materials to another area. The shovel is generally pushed under the material and is then lifted and carried so that the material remains on the shovel until the desired location is reached, or the shovel is lifted and the material thrown from the shovel to the desired area. Shovels usually have a relatively small material carrying platform but are usually heavy to lift when such platform has material thereon. Thus, moving material or cleaning material from a surface is time consuming, is hard work, and is hard on a person's back.

Some snow shovels have carrying platforms larger than normal shovels, but can only be fully loaded with relatively light snow. Some of these snow shovels are used to push snow in front of the shovel to a desired location. However, such pushing is very difficult once the snow builds up.

All shovels have a substantially rigid material carrying platform so the platform will not bend under the weight of the material being carried thereon. Even when the material carrying platform is made of relatively light materials, such as plastic, the material is formed or configured in such manner to make it rigid under normally expected loads. Where plow type tools are used to merely push materials from a surface, the plow blades are also rigid so they do not bend under load.

The need remains for a tool which is easily maneuverable and effective in clearing snow or debris such as dirt or gravel from a surface and which allows a user to more quickly and easily move relatively large amounts of material from one location to another.

SUMMARY OF THE INVENTION

According to the invention, a tool is provided with a relatively large, substantially rectangular material receiving platform, such platform generally being at least about eighteen inches square, and preferably about thirty inches square, with a handle, preferably about five feet in length, extending from one end so that the platform can be manipulated and pushed under material to be moved. When loaded, the material receiving platform is not lifted, but is dragged or pushed to the desired location where it is easily manipulated by lifting the handle to increase the tilt of the platform to unload the material from the platform. With the large platform, a much greater amount of material can be loaded onto the platform than on the platform of a normal shovel, and by dragging the loaded platform with its load, lifting of the heavy load is eliminated.

It has been found however, that for effective loading of the platform and for effectively holding the loaded material thereon during dragging of the platform, the platform should be made of a semi-rigid material which has just enough flex to curve under the weight of the load. This causes the forward edge of the platform to scrape the surface from which material is to be removed to thereby cleanly remove such material until the platform is loaded at which time the curving of the platform will cause the forward edge of the platform to angle from the surface and cause the platform to move upwardly in the material, indicating a full load. The curve under the material when loaded allows the material to remain on the platform during dragging of the platform while maintaining the handle at a natural position for dragging. The curve of the platform flattens out the forward portion of the platform to hold the material loaded thereon during dragging. The flex of the material is just enough to take on a small curve when loaded to hold the loaded material. If too flexible, the platform will bend too easily and not load properly, and the forward edge of the platform will not cleanly scrape the surface from which the material is being loaded. Thus, snow, dirt, gravel, or other material to be moved, will not be cleanly removed from the surface to be cleaned. If the material is not flexible, it digs into the surface to be cleaned and will not hold the load thereon during dragging.

In general, the tool for moving material according to the invention includes a rectangular platform for receiving material to be moved and having a forward edge and rearward edge defining a length therebetween and also having a width, said length and width each being between about eighteen and thirty-six inches. A handle extends from the rearward edge of the platform and is secured thereto by a handle receiving shank secured to the platform and extending from the rearward edge thereof forwardly, preferably about a third of the length, and imparting a slight curve to the platform over the length of its securement to the platform. The platform is made of material having a relatively flat configuration over its length forwardly of the handle receiving shank and over its width, but being just flexible enough to flex to continue the curve formed by the handle receiving shank, or to otherwise curve slightly so that material loaded onto the platform will substantially remain on the platform during dragging of the platform with the material thereon.

THE DRAWINGS

The best mode presently contemplated for carrying out the invention in actual practice is illustrated in the accompanying drawings, in which:

FIG. 2 is a side elevation of the tool prior to being loaded;

FIG. 3 is a side elevation of the tool during loading;

FIG. 4 is a side elevation of the tool when loaded; and

FIG. 5 is a side elevation of the tool being dragged.

DETAILED DESCRIPTION OF THE ILLUSTRATED EMBODIMENT

Figure 1:
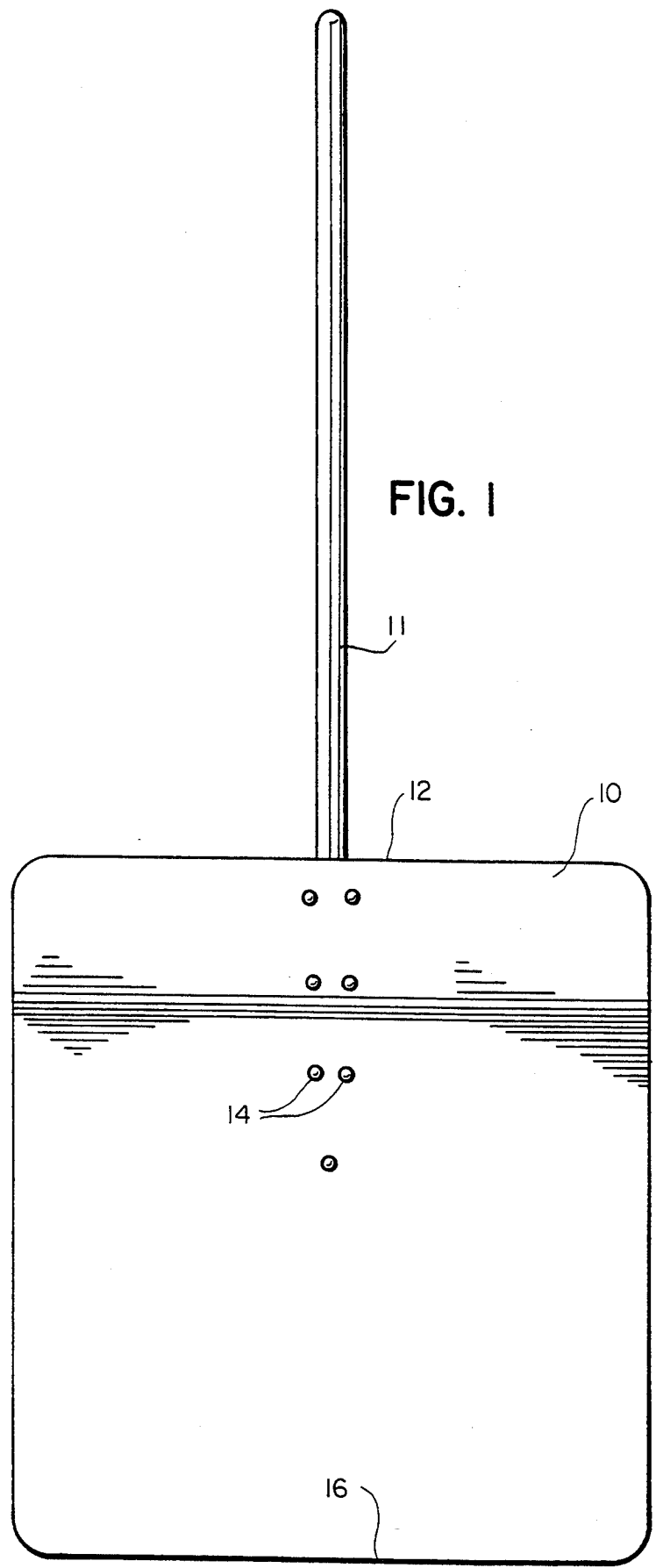
FIG. 1 is a front elevation of the tool.

The tool of the invention includes a platform 10, preferably a rectangular flat sheet of a material having slight flexibility. It has been found that a flat sheet of an aluminum-spring steel alloy such as used for highway signs is satisfactory. It is believed that such material is a 300H44 aluminum—spring steel alloy. The platform 10 is large compared to a shovel and may range from about eighteen by eighteen inches to about thirty-six by thirty-six inches. It has been found that a thirty inch square platform works well.

A handle 11 extends from the rear edge 12 of the platform 10 and is secured to the platform by a handle receiving shank 13, FIG. 2, secured to the platform by screws 14 and nuts 15. Rivets or other fasteners could be used in place of screws 14 and nuts 15. It is preferred that shank 13 curve slightly, as shown, to impart a curve to platform 10 over the length of securement of the shank 13 to platform 10. It has been found that the tool works well when the shank extends through about one third of the length of the platform from the rear edge. The handle 11 is preferably about five feet in length to provide easy maneuvering of the platform.

As shown in FIG. 2, the platform is preferably formed of a flat sheet of material so that although a slight curve is formed by shank 13, the portion of the platform extending forwardly of the shank remains substantially flat, until loaded. With this flat configuration, the forward edge 16 of the platform will rest against a surface 17 to be cleaned of material 18 substantially regardless of the angle of the platform and handle to such surface. As the platform is pushed into the material 18 on surface 17 to be cleaned, the platform curves or sags slightly as the platform becomes loaded. FIG. 3 shows this curve or sag as the material 18 builds up on platform 10.

As loading of the platform continues, the platform 10 will continue to curve until the forward edge 16 begins to curve upwardly off the surface 17 to be cleaned. FIG. 4 shows this curve in an exaggerated manner for the purpose of illustration. Further pushing of the platform 10 into the material 18 will cause the platform to ride up through the material. This is an indication to the user that the platform is loaded. Because, as mentioned above, the platform is much larger than that of a shovel, preferably about thirty inches square, when the tool of the invention is loaded, as shown in FIGS. 3 and 4, it would be very difficult, if not impossible, to lift and carry. The tool is designed not to be lifted, but to be advantageously dragged with the material loaded thereon to the place where the material is to be dumped. Thus, the user can merely drag the platform by the handle to the discharge location at which time the user can raise the handle, while pulling the platform, to allow the material to slide off the platform. However, during normal dragging of the platform, the platform has the configuration as shown in FIG. 5 with the forward portion of the platform curved under the load so that the load will tend to remain on the platform during dragging. If the platform was rigid, as with a normal shovel, it would not flex to form the curve or sag shown and the platform would remain at an incline to the surface 17 and the material thereon would slide off as the platform was being dragged. To lessen this sliding of material with a rigid platform, the handle would have to be lowered to be almost touching the surface, a very awkward position for a User to maintain during dragging. With the current invention the handle is held at a normal height during dragging making such dragging easy.

Rather than dragging the platform when loaded, it can continue to be pushed over the surface 17 to the unloading location, and in such instance, forward edge 16 curves up slightly as shown in FIG. 4 to easily ride over surface 17 or additional material thereon. With a rigid platform as with normal shovels, the platform would continue to dig into or scrape surface 17 unless, again, the handle was held at an abnormally low position during pushing.

The platform should be flat across its width, although sides could be provided to help hold loaded material thereon during dragging, but, if used, such sides must be designed so as not to interfere with the curving or sagging of the platform during loading. Thus, segmented sides could be provided that would curve with the platform. However, even without sides, the material which falls off the sides of the platform during dragging is minimal and the material loaded on the platform substantially remains on the platform during dragging.

The tool of the invention has been found to work well for cleaning show from a surface such as a walk or driveway, and for moving material such as dirt, gravel, or other materials from and over both hard surfaces such as pavement on a road, or soft surfaces, such as a dirt field. The slight flexibility of the platform allows the forward edge of the platform to scrape and clean the surface from which the material is to be removed until the platform is loaded, and then to allow the platform to be easily dragged or pushed over the surface without substantial loss of material. If the platform is too stiff or rigid, it will dig into the surface too much and cannot be dragged without substantial loss of material loaded thereon. If the platform is too soft or flexible, the platform will not load properly or fully and the platform will not clear the surface from which the material is to be cleared, but will tend to ride up into the material prior to full loading. The length and placement of the handle receiving shank also affects the operation of the tool. If the shank extends too far forward, it does not allow proper flexing of the platform. If it is too far back, depending upon the material used for the platform, it may allow too much flexing of the platform.

The large size of the platform allows a large amount of material to be loaded thereon so a cleanup job goes quickly and without the lifting required with a shovel. If desired, a D-handle could be placed at the end of handle 11 to be held by a user during pushing or pulling of the platform.

Whereas the invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A tool for moving material comprising:
a rectangular platform for receiving a normal load of material to be moved by the tool and having a forward edge and a rearward edge defining a length therebetween and having a width, said length and width each being between about eighteen and thirty-six inches;
a handle;
a handle receiving shank secured to said platform and extending from the rearward edge toward the forward edge for a portion of the length of the platform, said handle receiving shank forming a curve in said platform over the portion of the length of the platform secured to the handle receiving shank; and
said platform being made of a material having a normally flat configuration over its length forwardly of the handle receiving shank but being flexible enough so that, as the platform is loaded to a normal load to be carried by the tool, the platform will flex to continue the curve formed by the handle receiving shank over at least a portion of the platform forwardly of the handle receiving shank so that a portion of the platform adjacent the forward edge thereof extends under the load, whereby material loaded on the platform will substantially remain on the platform as the platform is dragged over a surface by means of the handle with the handle extending at an angle to the surface.

2. A tool according to claim 1, wherein the platform is made of a metallic material.

3. A tool according to claim 1, wherein the length and width of the platform are each about thirty inches.

4. A tool according to claim 1, wherein the handle is about five feet in length.

5. A tool according to claim 1, wherein the handle receiving shank extends forwardly from the rearward edge of the platform through about one-third of the length of the platform.

6. A tool for moving material comprising:
  a rectangular platform for receiving a normal load of material to be moved by the tool and having a forward edge and a rearward edge defining a length therebetween and having a width, said length and width each being between about eighteen and thirty-six inches;
  a handle;
  means for securing the handle to the platform; and
  said platform being made of a material having a normally flat configuration but being flexible enough so that, as the platform is loaded to a normal load to be carried by the tool, at least a portion of the platform will flex and sag and extend under the load whereby material loaded on the platform will substantially remain on the platform as the platform is dragged over a surface by means of the handle with the handle extending at an angle to the surface.

7. A tool for moving material comprising:
  a rectangular, metallic platform for receiving a normal load of material to be moved by the tool and having a forward edge and a rearward edge defining a length therebetween and having a width, said length and width each being between about eighteen and thirty-six inches;
  a handle;
  a handle receiving shank secured to said platform and extending from the rearward edge toward the forward edge for a portion of the length of the platform, said handle receiving shank forming a curve in said platform over the portion of the length of the platform secured to the handle receiving shank; and
  said platform being made of an aluminum-steel alloy material having a normally flat configuration over its length forwardly of the handle receiving shank but being flexible enough so that, as the platform is loaded to a normal load to be carried by the tool, the platform will flex to continue the curve formed by the handle receiving shank over at least a portion of the platform forwardly of the handle receiving shank so that a portion of the platform adjacent the forward edge thereof extends under the load whereby material loaded on the platform will substantially remain on the platform as the platform is dragged over a surface by means of the handle with the handle extending at an angle to the surface.

8. A tool according to claim 7, wherein the length and width of the platform are each about thirty inches.

9. A tool according to claim 8, wherein the handle is about five feet in length.

10. A tool according to claim 9, wherein the handle receiving shank extends forwardly from the rearward edge of the platform through about one-third of the length of the platform.

* * * * *